United States Patent
Vissa et al.

(10) Patent No.: US 10,565,407 B2
(45) Date of Patent: *Feb. 18, 2020

(54) STORING A USER ADDRESS IN A TRANSCEIVER IDENTIFICATION FIELD FOR IDENTIFICATION TAGS ON SMART OBJECTS

(71) Applicant: Motorola Mobility LLC, Chicago, IL (US)

(72) Inventors: Sudhir Vissa, Bensenville, IL (US); Vivek Tyagi, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,416

(22) Filed: Jun. 26, 2019

(65) Prior Publication Data
US 2020/0019737 A1 Jan. 16, 2020

Related U.S. Application Data

(63) Continuation of application No. 16/035,107, filed on Jul. 13, 2018, now Pat. No. 10,387,693.

(51) Int. Cl.
| | |
|---|---|
| *G06K 7/00* | (2006.01) |
| *G06K 7/10* | (2006.01) |
| *H04W 76/11* | (2018.01) |
| *H04W 76/14* | (2018.01) |
| *H04W 84/18* | (2009.01) |
| *H04W 84/12* | (2009.01) |

(52) U.S. Cl.
CPC ..... *G06K 7/10108* (2013.01); *G06K 7/10029* (2013.01); *H04W 76/11* (2018.02); *H04W 76/14* (2018.02); *H04W 84/12* (2013.01); *H04W 84/18* (2013.01)

(58) Field of Classification Search
CPC ..... H04W 76/14; H04W 76/11; H04W 84/12; H04W 84/18; G06K 7/10029
See application file for complete search history.

(56) References Cited

U.S. PATENT DOCUMENTS

| | | | |
|---|---|---|---|
| 10,387,693 B1* | 8/2019 | Vissa | G06K 7/10029 |
| 2008/0189441 A1* | 8/2008 | Jundt | G05B 19/042 710/3 |
| 2009/0002237 A1* | 1/2009 | Nonoyama | G01S 5/02 342/450 |
| 2010/0038415 A1* | 2/2010 | Leutgeb | G06K 7/0008 235/375 |

(Continued)

*Primary Examiner* — Thomas D Alunkal
(74) *Attorney, Agent, or Firm* — Amerson Law Firm, PLLC

(57) ABSTRACT

A method includes storing user information on a first identification tag of a first smart object of a first type to configure the first smart object to communicate with a device. An interrogator of the device is enabled to read a second identification tag attached to a second smart object of the first type. The user information is stored on the second identification tag responsive to determining that the second identification tag comprises default communication information to configure the second smart object to communicate with the device A connection is established between the device and the second smart object based on the user information.

20 Claims, 2 Drawing Sheets

(56) References Cited

U.S. PATENT DOCUMENTS

| | | | |
|---|---|---|---|
| 2011/0084811 A1* | 4/2011 | Park | G06K 7/0008 |
| | | | 340/10.1 |
| 2014/0343967 A1* | 11/2014 | Baker | G16H 10/65 |
| | | | 705/3 |
| 2015/0145671 A1* | 5/2015 | Cohen | G08B 21/18 |
| | | | 340/539.11 |
| 2017/0112315 A1* | 4/2017 | Shin | H04W 4/80 |
| 2017/0176239 A1* | 6/2017 | Pan | G01G 19/44 |
| 2017/0264597 A1* | 9/2017 | Pizot | H04L 63/0442 |

* cited by examiner

STORING A USER ADDRESS IN A TRANSCEIVER IDENTIFICATION FIELD FOR IDENTIFICATION TAGS ON SMART OBJECTS

BACKGROUND

Field of the Disclosure

The disclosed subject matter relates generally to mobile computing systems and, more particularly, to storing a user address in a transceiver identification field for identification tags on smart objects.

Description of the Related Art

The term Internet of Things (IoT) generally refers to the networking of various devices, appliances, vehicles, cameras, etc., with embedded sensors or other functionality. The breadth of devices being provided with IoT functionality greatly expanded. For example, smart objects include embedded sensors to monitor a user's movement, heart rate, temperature, moisture levels, posture, size, etc. or to initiate the operation of a lifelogging device (e.g., camera). Smart objects may include wearable items (e.g., clothing, shoes, watch, belt, wallet, etc.), luggage, personal items, daily wear items, disposable items, single-use items, etc. The smart object typically communicates with another device, such as the user's mobile phone, to log the sensor data. However, to enable the communication between the smart object and the mobile device a pairing process is often required to associate the particular smart object with the user and to enable communication with the mobile device. For example, with respect to smart objects of the same category, such as smart shirts, the pairing process must be repeated each time the user uses a new shirt. The pairing process is cumbersome and time-consuming in that it must be repeated every time a user changes clothing.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical articles.

DETAILED DESCRIPTION OF EMBODIMENT(S)

Figure 1:
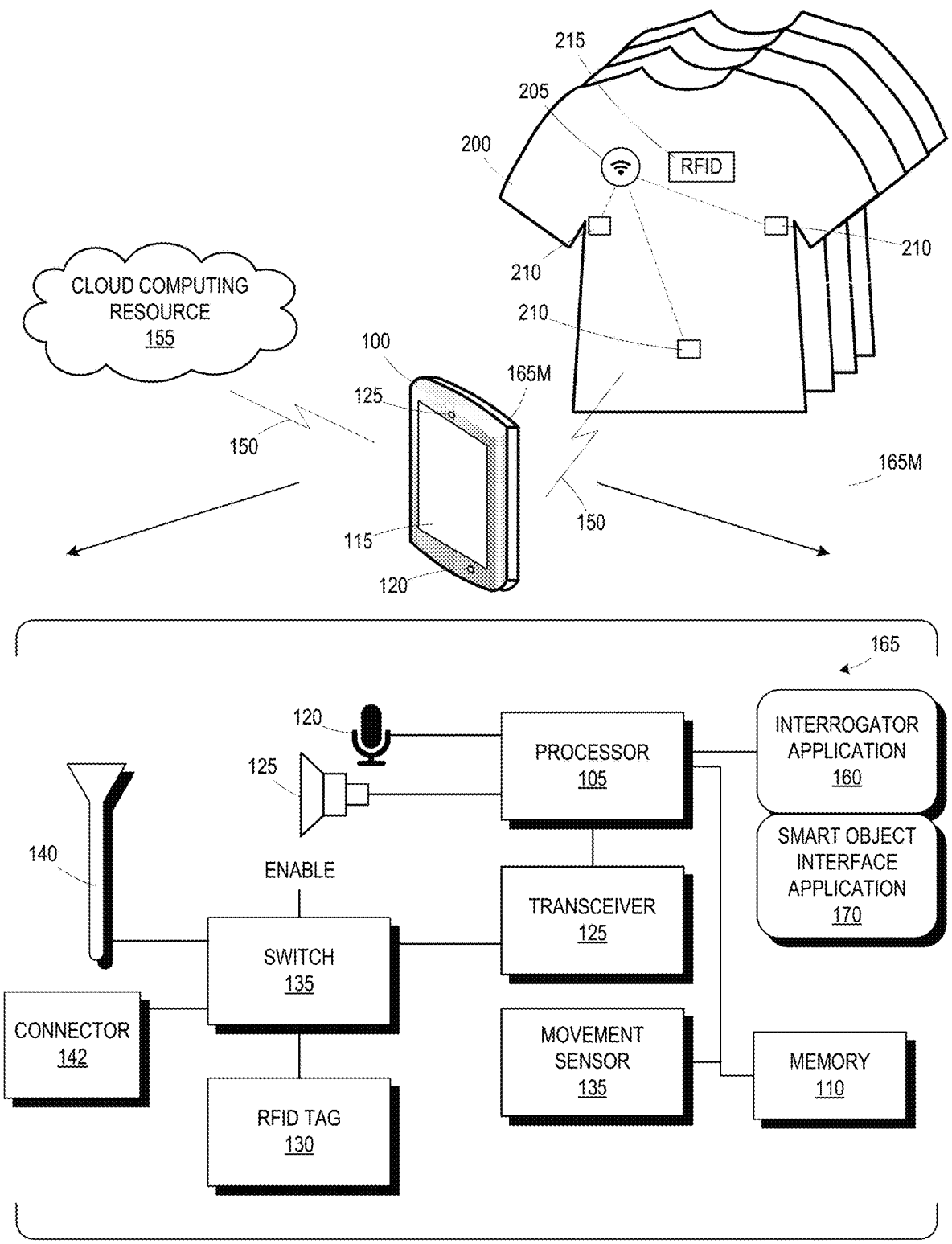
FIG. 1 is a simplified block diagram of a device operable to store a user address in a transceiver identification field for identification tags on smart objects, in accordance with some embodiments.
Figure 2:
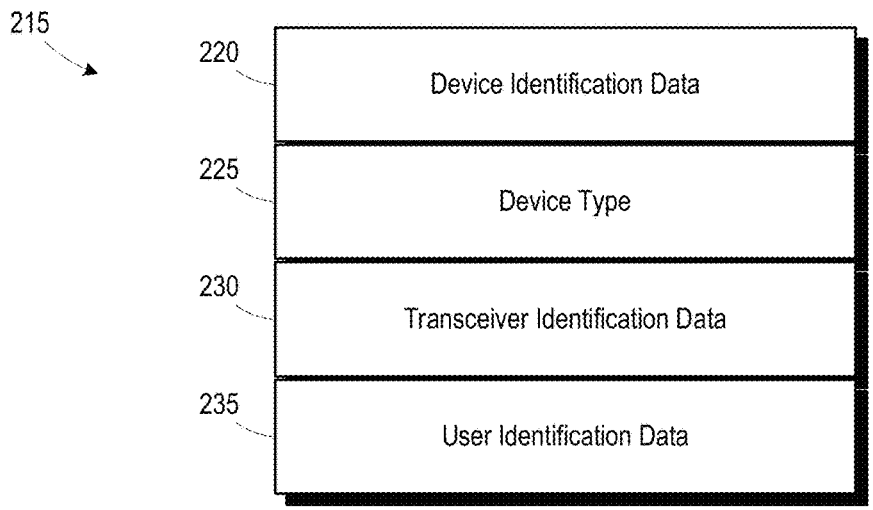
FIG. 2 is a diagram illustrating data stored in the identification tag on a smart object, in accordance with some embodiments.
Figure 3:
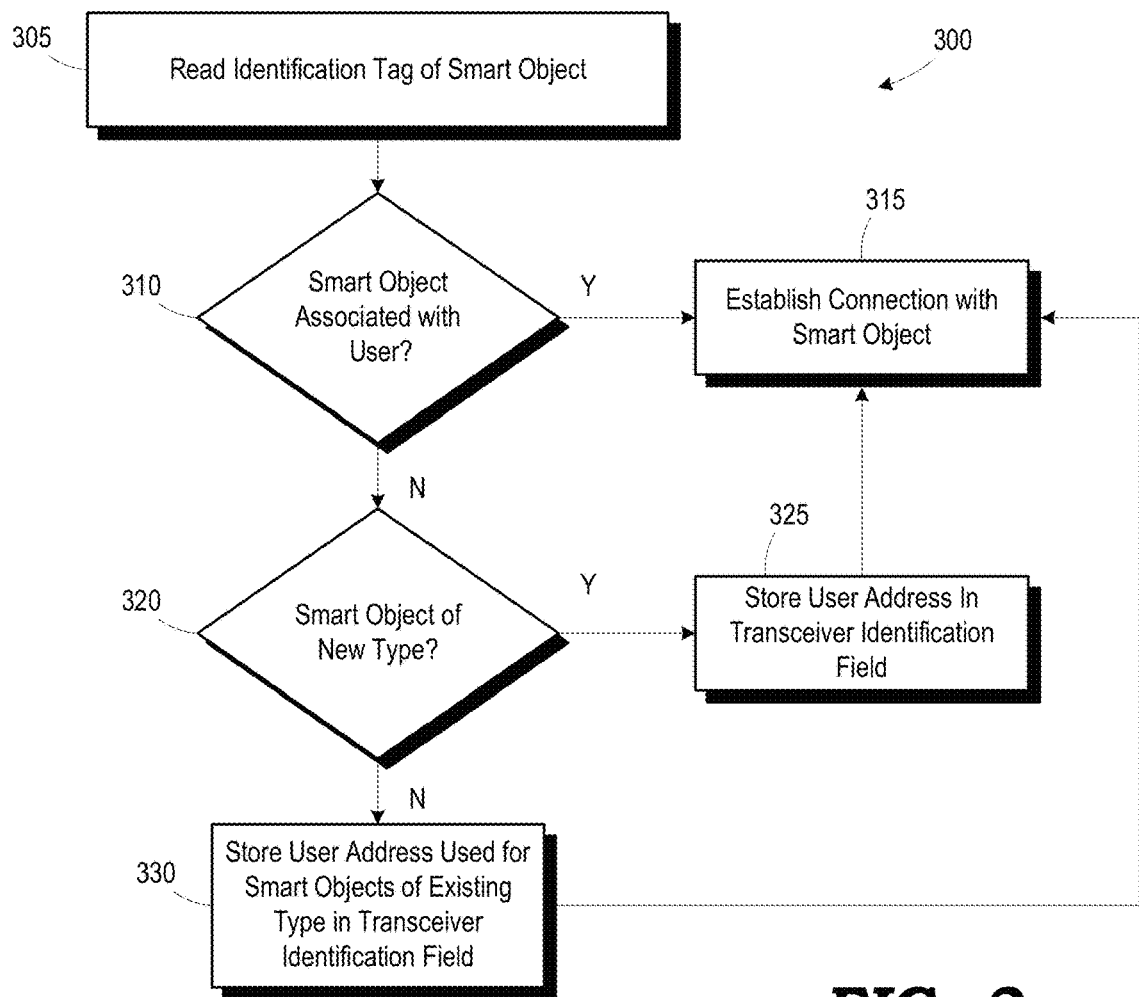
FIG. 3 is a flow diagram of a method 300 for storing user addresses in identification tags on smart objects, in accordance with some embodiments.

FIGS. 1-3 illustrate example techniques for storing a user address in a transceiver identification field for identification tags on smart objects. For example, a smart object is provided with various sensors and a radio for communicating with other connected devices, such as a user's mobile device. However, to enable use the smart object, it must be associated with the user and paired to the mobile device. As described herein, the mobile device may detect a smart object having the same type as a previously configured smart object that has not yet been configured. The mobile device may configure the smart objects of the same type with a common user address to associate the smart objects with the user and to facilitate communication between the smart objects and the mobile device using the common user address in a seamless manner.

FIG. 1 is a simplistic block diagram of one illustrative example of a device 100 disclosed herein that includes, among other things, a processor 105, a memory 110, a display 115, a speaker 120, a transceiver 125, an identification tag 130 (e.g., a radio frequency identification (RFID) tag), a switch 135, an antenna 140, and a motion sensor 145 (e.g., accelerometer, magnetometer, mercury switch, gyroscope, compass or some combination thereof). The memory 110 may be a volatile memory (e.g., DRAM, SRAM) or a non-volatile memory (e.g., ROM, flash memory, hard disk, etc.). The transceiver 125 transmits and receives signals via the antenna 140 to implement identification tag reading functionality and to communicate with remote devices. The transceiver 125 may include one or more radios for communicating according to different radio access technologies and over multiple frequency bands (e.g., cellular, Wi-Fi, BLUETOOTH®, ZigBee, etc.) over a communication line 150. The communication link 150 may have a variety of forms. In some embodiments, the communication link 150 may be a wireless radio or cellular radio link. The communication link 150 may also communicate over a packet-based communication network, such as the Internet. In one embodiment, a cloud computing resource 155 may interface with the device 100 to implement one or more of the functions described herein. In various embodiments, the device 100 may be embodied in a handheld or wearable device, such as a laptop computer, a handheld computer, a tablet computer, a mobile device, a telephone, a personal data assistant, a music player, a game device, a wearable computing device and the like.

The communication link 150 may also allow the device 100 to communicate with a smart object 200 using the transceiver 125. For purposes of illustration, the smart object 200 is illustrated as being a smart clothing item, such as a shirt. However, other smart objects 200 may be employed, such as wearable items (e.g., clothing, shoes, watch, belt, wallet, etc.), luggage, personal items, daily wear items, disposable items, single-use items, etc. The smart object 200 includes a transceiver 205, one or more sensors 210, and an identification tag 215. The sensors 210 may measure characteristics of the user, such as movement, heart rate, temperature, moisture levels, posture, size, etc. A plurality of smart objects 200 of the same type (i.e., multiple shirts) are illustrated. The techniques described herein are not limited to a particular type of smart object 200.

In the device 100, the processor 105 may execute instructions stored in the memory 110 and store information in the memory 110, such as the results of the executed instructions. Some embodiments of the processor 105 and the memory 110 may be configured to implement an interrogator application 160. For example, the processor 105 may execute the interrogator application 160 to query a nearby identification tag 215 associated with the smart object 200 to extract information about the smart object 200 (see discussion of FIG. 2 below). The processor 105, memory 110, transceiver 125 and interrogator application 160 collectively define an interrogator 165. The particular software and signaling techniques for implementing the interrogator 165 are known to those of ordinary skill in the art, so they are not described in detail herein.

In some embodiments, one or more portions of the system illustrated in FIG. 1 may be housed in an interrogator module 165M that may be attached to the mobile device 100 as being opposed to being mounted within the mobile device 100. For example, a separate transceiver, antenna, identification tag, etc., for implementing the interrogator 165 may be housed in the interrogator module 165M and physically and electrically attached to the mobile device 100.

In general, identification tags 130, 215 are passive devices that does not require a power source to function. An identification tag 130, 215 includes non-volatile memory or logic that stores data and transmits the stored data using a backscattering modulation technique responsive to a query from an interrogator (e.g., the interrogator 165 reading the identification tag 215). The particular circuit elements for constructing identification tags 130, 215 are known to those of ordinary skill in the art, so they are not described in detail herein. The switch 135 allows the identification tag 130 and the interrogator 165 to share the antenna 140 responsive to an enable signal. In some embodiments, separate antennas (not shown) may be provided.

Some embodiments of the processor 115 and memory 120 may be configured to implement a smart object interface application 170 to configure smart objects 200 encountered by the device 100 and to perform portions of a method 300 shown in FIG. 3 and discussed below. One or more aspects of the method 300 may also be implemented using the cloud computing resource 155 in addition to the smart object interface application 170.

FIG. 2 is a diagram illustrating data stored in the identification tag 215 on the smart object 200, in accordance with some embodiments. The data may include a device identification data field 220 (e.g., unique device ID), a device type field 225 (e.g., type classification, such as UPC code), a transceiver identification data field 230 (i.e., identifying the transceiver 210 of the smart object), an assigned user data field 235, etc. Not all fields 220-235 may be employed, and other fields may be added. In some embodiments, the transceiver identification data field 230 follows a media access control (MAC) format including 6 bytes. The first three bytes identify the manufacturer, and the next three bytes identify the device. Either all of the bytes, or just the three device bytes may be set dynamically.

FIG. 3 is a flow diagram of a method 300 for storing user addresses in identification tags on smart objects 200, in accordance with some embodiments. In method block 305, the interrogator 165 reads the identification tag 215 associated with a smart object 200, such as the shirt shown in FIG. 1. The RFID scan performed by the interrogator 165 is power controlled so as to detect only identification tags 215 in close proximity range (i.e., on the user's body). For purposes of the illustration in FIG. 2, it is assumed that when a particular smart object 200 has not yet been associated with a particular user, its unassigned state may be designated by storing a default value in the transceiver ID field 230. When the default value is present in the transceiver ID field 230, the smart object 200 inhibits operation of the transceiver 205. The connection between the interrogator 165 and the identification tag 215 is independent of the connection 150 that may be made between the transceivers 125, 205.

In method block 310, the smart object interface application 170 determines if the smart object 200 is associated with the user of the device 100. For example, if the smart object 200 is unassigned, the transceiver ID field 230 is set to a default value. The user identification field 235 may also identify the user. The user identification field 235 may specify a unique ID assigned to the user by the manufacturer of the smart object 200.

If the smart object 200 has already been assigned in method block 310, the transceiver 205 of the smart object 200 is already enabled, and the transceiver 125 of the device 100 may connect to the smart object 200 using a communication protocol (e.g., BLUETOOTH® or Wi-Fi).

If the smart object 200 has not been associated with the user in method block 310, the smart object interface application 170 determines if the smart object is a new type of object, or if the particular type has already been encountered by the device 100 (e.g., a second shirt). The device type field 225 may specify the device type.

If the smart object is a new type of object in method block 320, the smart object interface application 170 stores a user address in the transceiver ID field 230. The smart object interface application 170 may communicate with a vendor of the smart object 200 using the cloud computing resource 155 to retrieve an assigned user address. The smart object interface application 170 may also store data in the device ID field 220 to be able to distinguish devices of the same type. The device ID field 220 may simply be an index of the number of smart objects 200 of the particular type associated with the user. The storing of the user address in the transceiver ID field 230 enables the transceiver 205, and the connection between the transceiver 125 of the device 100 and the transceiver 205 of the smart object 200 may be established in method block 315.

In some embodiments, additional security may be provided, as the vendor may check a UPC code stored in the device type field 225 to verify that the user has actually purchased the smart object 200 that is being configured.

If the smart object is a not a new type of object in method block 320 (i.e., the type has been encountered before), the smart object interface application 170 writes the user address that was previously assigned to smart objects 200 of that type to the transceiver ID field 230. The storing of the user address in the transceiver ID field 230 enables the transceiver 205, and the connection between the transceiver 125 of the device 100 and the transceiver 205 of the smart object 200 may be established in method block 315.

In this manner all smart objects 200 associated with the user and having the same type may be assigned the same user address, so they appear as the same smart object 200 to the device 100 when the connection 150 is established between the transceiver 125 of the device 100 and the transceiver 205 of the smart object 200. As a result the connection between the smart object 200 and the device 100 may be seamless, and the data collected from the sensors 210 may be accumulated as if the user were wearing the same smart object 200. The user need not manually configure each smart object of the same type 200 or establish a connection between the device 100 and the smart object 200 each day.

However, this arrangement makes it possible that the user may be proximate two smart objects 200 having the same user address or of the same type, where one is associated with the user and one is in its default state. Connecting two devices with the same user address can give rise to network conflicts. In general the smart objects 200 are classified by type such that it is unlikely that the user would wear or carry two objects of the same type at a particular time. For example, shirts, pants, jackets, wallets, etc., would each have different types. The possibility still exists that the user may be near two smart objects 200 of the same type, such as in a closet containing multiple shirts. In such a situation, the smart object interface application 170 may identify the presence of multiple smart objects 200 of the same type by recognizing that the smart objects 200 have the same user address in the transceiver ID field 230, but different values in the device ID field 220. In such a situation, the smart object interface application 170 may suppress the connection between the device 100 and the smart objects 200 to avoid a network conflict.

If the reading of the identification tags in method block 305 identifies a first smart object 200 that has already been associated with the user, and a second smart object in its default state, the method 300 may be paused and the interrogation repeated until the conflict no longer exists.

In some embodiments, the reading of the identification tag 215 of the smart object 200 in method block 305 may occur in response to certain trigger events, For example, the movement sensor 135 may be used to determine if the user is engaging in a fitness activity or executes a particular movement pattern (e.g., picking up or setting down luggage). The device 100 may also determine if it is stowed in a pocket of the user (e.g., using motion and/or ambient light data). The trigger data may also be generated by the device 100 itself, such as the occurrence of a calendar event, a particular time (e.g., the time the user normally dresses or leaves the house, or a notification from a different application.

In some embodiments, certain aspects of the techniques described above may be implemented by one or more processors of a processing system executing software. The techniques may be implemented by executing software on a computing device, such as the processor 105 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 110 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices, such as Flash memory, a cache, random access memory (RAM), or other non-volatile memory device or devices and the like. The executable instructions stored on the non-transitory computer readable storage medium may be in source code, assembly language code, object code or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes storing user information on a first identification tag of a first smart object of a first type to configure the first smart object to communicate with a device. An interrogator of the device is enabled to read a second identification tag attached to a second smart object of the first type. The user information is stored on the second identification tag responsive to determining that the second identification tag comprises default communication information to configure the second smart object to communicate with the device A connection is established between the device and the second smart object based on the user information.

A device includes a first transceiver, an interrogator, and a processor coupled to the interrogator and the first transceiver. The processor is to store user information on a first identification tag of a first smart object of a first type to configure the first smart object to communicate with a device, enable an interrogator of the device to read a second identification tag attached to a second smart object of the first type, store the user information on the second identification tag responsive to determining that the second identification tag comprises default communication information to configure the second smart object to communicate with the device, and establish a connection between the device and the second smart object based on the user information.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    storing user information on a first identification tag of a first smart object of a first type to configure the first smart object to communicate with a device;
    enabling an interrogator of the device to read a second identification tag attached to a second smart object of the first type;
    storing the user information on the second identification tag responsive to determining that the second identification tag comprises default communication information to configure the second smart object to communicate with the device; and
    establishing a connection between the device and the second smart object based on the user information.

2. The method of claim 1, further comprising:
wherein enabling the interrogator comprises identifying a set of identification tags proximate the device, the set including the second identification tag;
repeating the enabling of the interrogator and the identifying until the set only includes the second identification tag; and
establishing the connection responsive to the set only including the second identification tag.

3. The method of claim 1, further comprising:
identifying a trigger event; and
enabling the interrogator responsive to the trigger event.

4. The method of claim 3, wherein the trigger event comprises a detection of a stowed mode of the device.

5. The method of claim 3, wherein the trigger event comprises a detection of a fitness activity mode of the device.

6. The method of claim 3, wherein the trigger event comprises a time.

7. The method of claim 1, further comprising enabling a second transceiver connected to the second identification tag, wherein the second transceiver employs the user information.

8. The method of claim 1, wherein establishing the connection comprises establishing one of a peer-to-peer connection or a Wi-Fi connection.

9. The method of claim 1, wherein the first and second smart objects comprise articles of clothing.

10. The method of claim 1, further comprising:
receiving first sensor data over the connection; and
storing the first sensor data with second sensor data previously received from the first smart object.

11. A device, comprising:
a first transceiver;
an interrogator; and
a processor coupled to the interrogator and the first transceiver, wherein the processor is to store user information on a first identification tag of a first smart object of a first type to configure the first smart object to communicate with a device, enable an interrogator of the device to read a second identification tag attached to a second smart object of the first type, store the user information on the second identification tag responsive to determining that the second identification tag comprises default communication information to configure the second smart object to communicate with the device, and establish a connection between the device and the second smart object based on the user information.

12. The device of claim 11, wherein the processor is to enable the interrogator and identify a set of identification tags proximate the device, the set including the second identification tag, repeat the enabling of the interrogator and the identifying until the set only includes the second identification tag, and establish the connection responsive to the set only including the second identification tag.

13. The device of claim 11, wherein the processor is to identify a trigger event and enable the interrogator responsive to the trigger event.

14. The device of claim 13, wherein the trigger event comprises a detection of a stowed mode of the device.

15. The device of claim 13, wherein the trigger event comprises a detection of a fitness activity mode of the device.

16. The device of claim 13, wherein the trigger event comprises a time.

17. The device of claim 11, wherein the processor is to enable a second transceiver connected to the second identification tag, wherein the second transceiver employs the user information.

18. The device of claim 11, wherein the connection comprises one of a peer-to-peer connection or a Wi-Fi connection.

19. The device of claim 11, wherein the first and second smart objects comprise articles of clothing.

20. The device of claim 11, wherein the processor is to receive first sensor data over the connection and store the first sensor data with second sensor data previously received from the first smart object.

* * * * *